United States Patent
Hattori

(10) Patent No.: US 6,908,072 B2
(45) Date of Patent: Jun. 21, 2005

(54) VARIABLE FLOW CONTROL VALVES

(75) Inventor: Satoshi Hattori, Aichi-ken (JP)

(73) Assignee: Aisan Kogyo Kabushiki Kaisha, Obu (JP)

(*) Notice: Subject to any disclaimer, the term of this patent is extended or adjusted under 35 U.S.C. 154(b) by 0 days.

(21) Appl. No.: 10/631,770

(22) Filed: Aug. 1, 2003

(65) Prior Publication Data

US 2004/0021119 A1 Feb. 5, 2004

(30) Foreign Application Priority Data

Aug. 2, 2002 (JP) ...................................... 2002-260571

(51) Int. Cl.[7] ................................................ F16K 1/22
(52) U.S. Cl. ........................ 251/306; 251/317; 277/549
(58) Field of Search ............................... 251/305, 306, 251/317; 277/502, 549, 551, 572

(56) References Cited

U.S. PATENT DOCUMENTS 4,032,108 A * 6/1977 Kintner ...................... 251/306
5,669,350 A * 9/1997 Altmann et al. ............ 123/337
6,135,418 A * 10/2000 Hatton ....................... 251/306

FOREIGN PATENT DOCUMENTS

JP         7279676         10/1995

* cited by examiner

Primary Examiner—Edward K. Look
Assistant Examiner—John K. Fristoe, Jr.
(74) Attorney, Agent, or Firm—Dennison, Schultz, Dougherty & MacDonald

(57) ABSTRACT

A variable flow control valve (1) includes a valve member (4) and a valve body (2). A seal member (5) is mounted on the peripheral portion of the valve member and has end portions (5a) in a circumferential direction of the valve member. The valve body may define a flow channel (2) and the valve member is rotatably disposed within the flow channel. A seat surface (2b) is disposed on an inner wall of the flow channel and has end portions in a circumferential direction of the inner wall. The seal member of the valve member opposes to the seat surface when the valve member is in a close position. Projections (2c) are disposed adjacent to the end portions of the seat surface and serves to engage the respective end portions of the seal member when the valve member is in the close position.

12 Claims, 3 Drawing Sheets

VARIABLE FLOW CONTROL VALVES

This application claims priority to Japanese patent application serial number 2002-260571, the contents of which are incorporated herein by reference.

BACKGROUND OF THE INVENTION

1. Field of the Invention

The present invention relates to variable flow control valves, and in particular to variable flow control valves for controlling flow of gaseous fluids, e.g., air.

2. Description of the Related Art

Japanese Laid-Open Patent Publication No. 7-279696 teaches a known throttle valve, in which resilient seal members are attached to an outer peripheral portion of a throttle valve in positions opposing to flat seat surfaces defined in an inner wall of an air flow channel of a throttle body. More specifically, the seat surfaces are defined by semi-circular arc shaped ledges formed on the inner wall of the air flow channel. The resilient seal members are made of rubber and have projections that may contact the respective ledges of the air flow channel when the throttle valve is in a close position. The projections of the seal members may be pressed against the corresponding ledges of the air flow channel due to the pressure difference between an upstream side and a downstream side of the throttle valve. Therefore, even if throttle bodies that have some differences in size or configurations have been used, the projections of the rubber seal members may closely contact the seat surfaces of the throttle bodies, so that air-tight seal can be maintained.

However, this sealing structure still has problems as will be hereinafter explained with reference to FIGS. 4 and 5, which show schematic sectional plan view and a cross sectional view taken along line V—V in FIG. 4, respectively, of a known variable flow control valve incorporating the teaching of the throttle valve of the above publication. Referring to FIGS. 4 and 5, resilient seal members 12 made of rubber are attached to a valve member 13 and oppose to seat surfaces formed on a wall of an air flow channel defined in a valve body 14. However, because clearances 15 may be formed between the valve 13 and the inner wall of the valve body 14 at both circumferential ends of each seal member 12, the air may flow through the clearances 15 via positions adjacent to the circumferential ends of the seal members 12, resulting in leakage of air. Therefore, air-tight seal may not be maintained.

SUMMARY OF THE INVENTION

It is accordingly an object of the present invention to teach improved variable flow control valves that can reliably prevent accidental leakage of fluids between valves and valve bodies.

According to one aspect of the present teachings, variable flow control valves are taught that may include a seal member mounted on a peripheral portion of a valve member. A seat surface may be disposed on an inner wall of a flow channel defined in a valve body. Projections may be disposed adjacent to end portions in the circumferential direction of the seat surface and may engage the respective end portions of the seal member when the valve member is in a close position.

Therefore, when the valve is in the close position, the projections on the side of the valve body may engage the end portions of the seal member that is mounted on the valve member. Because the valve member may be sealed against the valve body at the end portions of the seal member in addition to the sealing area along the length of the seal member, leakage of fluid through the valve member in the close position may be reduced or minimized and the sealing performance of the valve member can be improved.

In another aspect of the present teachings, each of the projections may have a first inclined surface and each of the end portions of the seal member may have a second inclined surface, so that the first inclined surface may engage the corresponding second inclined surface. As a result, the valve member may be further reliably sealed at the end portions of the seal member.

DETAILED DESCRIPTION OF THE INVENTION

Figure 1:
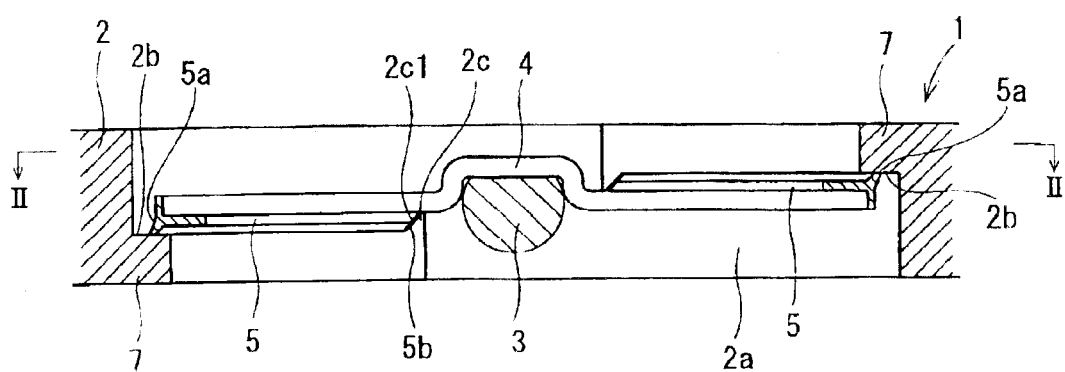
FIG. 1 is a vertical sectional view of a representative variable flow control valve.

In one embodiment of the present teachings, variable flow control valves may include a valve member and a valve body. A seal member may be mounted on the peripheral portion of the valve member and may have end portions in a circumferential direction of the valve member. The valve body may define a flow channel and the valve member is rotatably disposed within the flow channel. A seat surface may be disposed on an inner wall of the flow channel and may have end portions in a circumferential direction of the inner wall. The seal member of the valve member may oppose to the seat surface when the valve member is in a close position. Projections may be disposed adjacent to the end portions of the seat surface and may serve to engage the respective end portions of the seal member when the valve member is in the close position.

Therefore, when the valve member is in the close position, the projections on the side of the valve body may engage the end portions of the seal member that is mounted on the valve member. Because the valve member may be sealed against the valve body at the end portions of the seal member in addition to the sealing area along the length of the seal member, leakage of fluid through the valve member in the close position may be reduced or minimized and the sealing performance of the valve member can be improved.

In another embodiment of the present teachings, variable flow control valves are taught that may include a valve member having a first surface and a second surface. Each of the first surface and the second surface may have a peripheral portion. A first seal member may be mounted on the peripheral portion of the first surface of the valve member. A second seal member mounted on the peripheral portion of the second surface of the valve member. Each of the first and second seal members may extend along substantially half the circumferential length of the valve member, i.e., an angular range of about 180°, and may have end portions on both sides in the circumferential direction. A valve body may define a flow channel and the valve member is rotatably disposed within the flow channel. A first seat surface and a second seat surface may be disposed on an inner wall of the flow channel. Each of the first and second seat surfaces may extend along substantially half the circumferential length of the inner wall and has end portions on both ends in the circumferential direction. The first seal member and the second seal member may oppose to the first set surface and the second seat surface, respectively, when the valve member is in a close position. Projections may be disposed adjacent to the end portions of each of the first and second seat surfaces and may engage the respective end portions of the first and second seal members when the valve member is in the close position.

Also with this arrangement, the valve member may be sealed against the valve body at the end portions of each seal member in addition to the sealing area along the length of each seal member, leakage of fluid through the valve member in the close position may be reduced or minimized and the sealing performance of the valve member can be improved.

In another embodiment of the present teachings, each of the projections extends from the seat surface (or each seat surface) in a direction substantially parallel to an axial direction of the flow channel. Each of the projections has a first inclined surface, and each of the end portions of the seal member (or each seal members) has a second inclined surface, the first inclined surface and the second inclined surface are inclined relative to the axial direction of the flow channel by substantially the same angle and engage with each other when the valve member is in the close position. As a result, the valve member may be further reliably sealed at the end portions of the seal member (or each seal members).

In another embodiment of the present teachings, the projections are formed integrally with the seat surface or each seat surface may have the projections that are formed integrally therewith.

In another embodiment of the present teachings, a lip seal may be formed on the seal member (or each seal members), so that the lip seal contacts the seat surface (or the corresponding seat surface) when the valve member is in the close position.

In another embodiment of the present teachings, a ledge (s) may be formed on the inner wall of the flow channel. The ledge may have an end surface in the axial direction of the flow channel and the end surface may comprise the seat surface. Preferably, the projections may be formed integrally with the ledge.

Each of the additional features and teachings disclosed above and below may be utilized separately or in conjunction with other features and teachings to provide improved variable flow control valves and methods of using such improved variable control valves. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 2:
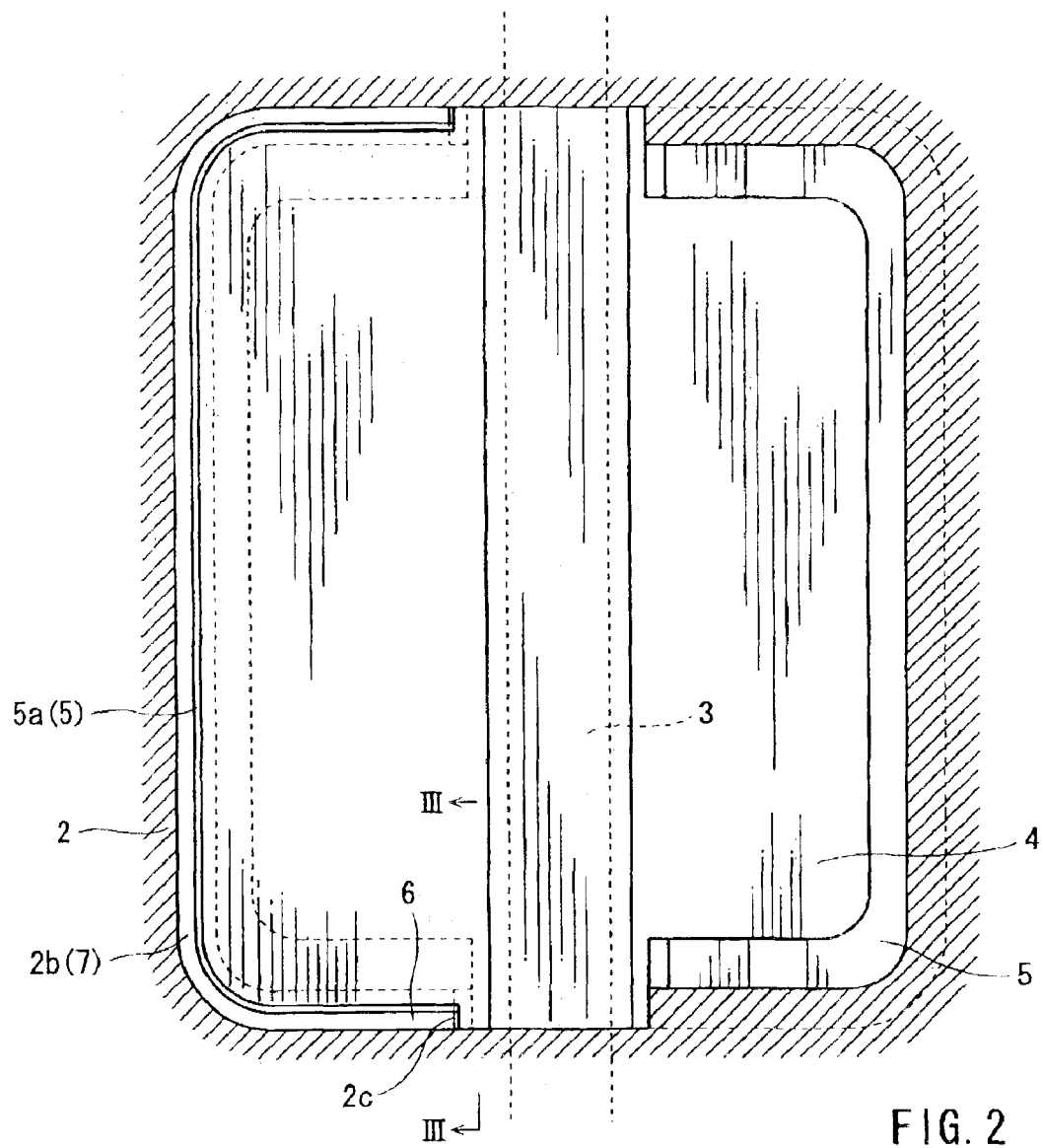
FIG. 2 is a sectional view taken along line II—II in FIG. 1 with a part omitted.

A representative embodiment will now be described with reference to FIGS. 1 to 3. Referring to FIGS. 1 and 2, a representative variable flow control valve 1 may include a valve body 2 that defines a flow channel 2a through which air may flow. For example, intake air may flow through the flow channel 2a and may then be supplied to an engine of an automobile (not shown). A valve shaft 3 may extend through the flow channel 2a and have both ends that are rotatably supported by the valve body 2. A valve member 4 may have a substantially rectangular configuration and may be disposed within the flow channel 2a. The valve member 4 may be fixedly mounted on the valve shaft 3, so that the valve member 4 can rotate as the valve shaft 3 rotates in order to control the flow of the air through the flow channel 2a. An actuator (not shown) may be coupled to the valve shaft 3, so that the rotational position of the valve member 4 can be controlled in a known manner. Resilient seal members 5 may be made of rubber and may be fixedly attached to peripheral portions of upper and lower surfaces as viewed in FIG. 2 of the valve member 4. One of the seal members 5 may extend along the peripheral portion of the left side half of the lower surface of the valve member 4 as viewed in FIG. 1. The other of the seal members 5 may extend along the peripheral portion of the right side half of the upper surface of the valve member 4. Flat seat surfaces 2b may be defined by ledges 7 that are formed on an inner wall of the flow channel 2a. Each of the ledges 7 may extend by substantially half the circumferential length of the inner wall of the flow channel 2a, so that the seat surfaces 2b may oppose to the respective seal members 5 when the valve member 4 is in a close position as shown in FIGS. 1 and 2. In addition, each of the seal members 5 may have a lip 5a that may serve to closely contact the corresponding seat surface 2b.

Figure 3:
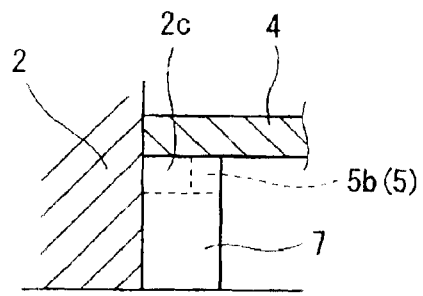
FIG. 3 is a sectional view taken along line III—III in FIG. 2.
Figure 4:
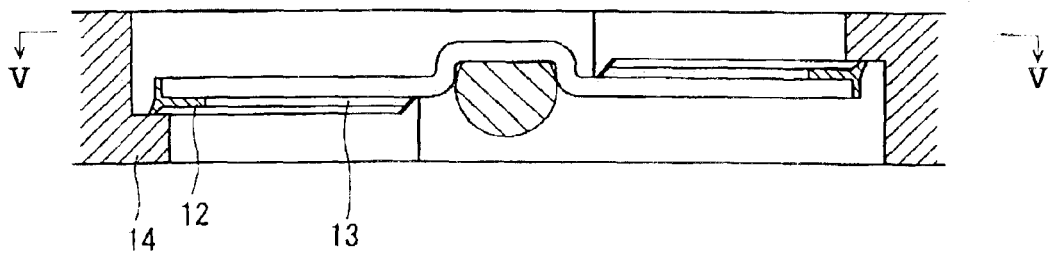
FIG. 4 is a vertical sectional view of a known variable flow control valve.
Figure 5:
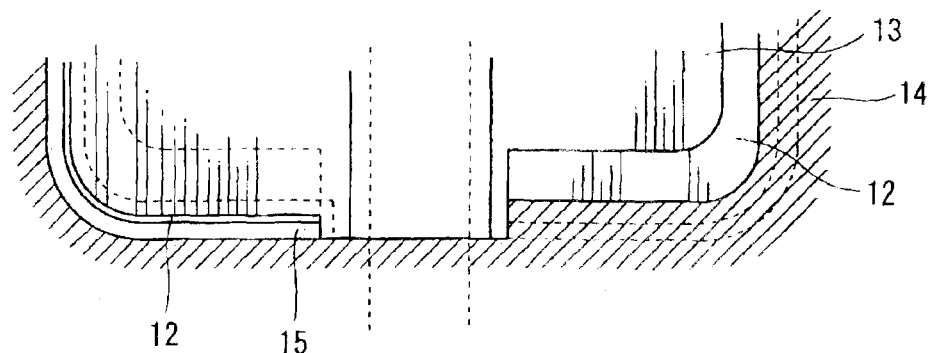
FIG. 5 is a sectional view taken along line IV—IV in FIG. 1 with a part omitted.

Referring to FIGS. 2 and 3, projections 2c may be formed on both circumferential ends of each of the ledges 7 and may extend from the corresponding seat surface 2b in a direction substantially parallel to the axial direction of the flow channel 2a. Therefore, the projections 2c may oppose to the corresponding one of the upper and lower surfaces of the valve member 4 when the valve member 4 is in the close position. Preferably, the height of the projections 2c may be determined such that the projections 2c do not contact the corresponding surfaces of the valve member 4 but may be spaced by a very small clearance from the surfaces of the valve member 4 when the valve member 4 is in the close position. In addition, circumferential ends 5b of each seal member 5 may be configured to closely contact the projections 2c of the corresponding seat surface 2b. Preferably, each projection 2c may have a substantially triangular configuration to define an inclined surface 2c1 that is inclined relative to the axial direction of the flow channel 2a and each circumferential end 5b of the seal member 5 may be inclined to conform to the inclination of the inclined surface 2c1. As a result, the projection 2c may reliably closely contact the corresponding circumferential end 5b of the seal member 5. However, the projections 2c and the circumferential ends 5b of each seal member 5 may have any other configurations as long as a close contact relation can be ensured.

The operation of the above representative variable flow control valve 1 will now be described. When the valve member 4 is rotated by the actuator from an open position to the close position as shown in FIGS. 1 and 2, the lip 5a of each seal member 5 may contact with the corresponding seal surface 2b. At the same time, the circumferential ends 5b of each seal member 5 may closely contact the corresponding projections 2c disposed at the circumferential ends of the ledge 7. As a result, the valve member 4 may be reliably sealed by the seal members 5 also at the circumferential ends of each of left and right side halves of the valve member 4 due to close contact between the circumferential ends 5b of each seal member 5 and the corresponding projections 2c. Although the seal members 5 do not extend to reach terminal ends 6 of the valve member 4 in the axial direction of the valve shaft 3, any leakage of air at these positions 6 can still may be minimized because the projections 2c may oppose to these portions 6 by a very small distance. Of course, an additional seal member may be provided in order to prevent leakage of the air also at these positions 6.

What is claimed is:

1. A variable flow control valve comprising:

a valve member having a peripheral portion;

a seal member mounted on the peripheral portion of the valve member and having end portions in a circumferential direction of the valve member;

a valve body defining a flow channel, wherein the valve member is rotatably disposed within the flow channel;

a seat surface disposed on an inner wall of the flow channel and having end portions in a circumferential direction of the inner wall, wherein the seal member of the valve member opposes to the seat surface when the valve member is in a close position; and projections disposed adjacent to the end portions of the seat surface and each extending from the seat surface in a direction substantially parallel to an axial direction of the flow channel, wherein the projections engage the respective end portions of the seal member when the valve member is in the close position.

2. A variable flow control valve as in claim 1, wherein each of the projections has a first inclined surface, each of the end portions of the seal member has a second inclined surface, the first inclined surface and the second inclined surface are inclined relative to the axial direction of the flow channel by substantially the same angle and engage with each other when the valve member is in the close position.

3. A variable flow control valve as in claim 1, wherein the projections are formed integrally with the seat surface.

4. A variable flow control valve as in claim 1, further including a lip seal formed on the seal member, so that the lip seal contacts the seat surface when the valve member is in the close position.

5. A variable flow control valve as in claim 1, further including a ledge formed on the inner wall of the flow channel, wherein the ledge has an end surface in the axial direction of the flow channel and the end surface comprises the seat surface.

6. A variable flow control valve as in claim 5, wherein the projections are formed integrally with the ledge.

7. A variable flow control valve comprising:

a valve member having a first surface and a second surface, wherein each of the first surface and the second surface has a peripheral portion;

a first seal member and a second seal member mounted on the peripheral portions of the first surface and the second surface of the valve member, respectively, wherein each of the first and second seal members extends along substantially half the circumferential length of the valve member and has end portions on both sides in the circumferential direction, a valve body defining a flow channel, wherein the valve member is rotatably disposed within the flow channel;

a first seat surface and a second seat surface disposed on an inner wall of the flow channel, wherein each of the first and second seat surfaces extends along substantially half the circumferential length of the inner wall and has end portions on both sides in the circumferential direction;

the first seal member and the second seal member opposing to the first seat surface and the second seat surface, respectively, when the valve member is in a close position; and projections disposed adjacent to the end portions of each of the first and second seat surfaces and extending from the respective first and second seat surfaces in a direction substantially parallel to an axial direction of the flow channel, wherein the projections engage the respective end portions of the first and second seal members when the valve member is in the close position.

8. A variable flow control valve as in claim 7, wherein each of the projections has a first inclined surface that is engageable with a second inclined surface defined by the corresponding one of the end portions of the first seal member or the second seal member, the first inclined surface and the second inclined surface are inclined relative to the axial direction of the flow channel by substantially the same angle and engage with each other when the valve member is in the close position.

9. A variable flow control valve as in claim 7, wherein the projections of the first seat surface are formed integrally with the first seat surface, and the projections of the second seat surface are formed integrally with the second seat surface.

10. A variable flow control valve as in claim 7, further including a lip seal formed on each of the first and second seal members, so that the lip seal of the first seal member contacts the first seat surface and the lip seal of the second seal member contacts the second seat surface when the valve member is in the close position.

11. A variable flow control valve as in claim 7, further including a first ledge and second ledge formed on the inner wall of the flow channel, wherein the first ledge and the second ledge have end surfaces in the axial direction of the flow channel, respectively, the end surface of the first ledge comprises the first seat surface, and the end surface of the second ledge comprises the second seat surface.

12. A variable flow control valve as in claim 11, wherein the projections of the first seat surface are formed integrally with the first ledge and the projections of the second seat surface are formed integrally with the second ledge.

* * * * *